United States Patent [19]

Crownover

[11] 4,089,379
[45] May 16, 1978

[54] GLOVE AND TOOL DEVICE

[76] Inventor: Frederick S. Crownover, Rte. 1, Box 27, Columbiana, Ala. 35051

[21] Appl. No.: 760,553

[22] Filed: Jan. 19, 1977

[51] Int. Cl.² .......................... A01B 1/06; A01B 1/14
[52] U.S. Cl. .................................... 172/370; 2/17; 172/378; 294/59; 294/131
[58] Field of Search ............... 172/370, 378; 2/160, 2/161 R, 161 A, 17, 18; 294/55, 57, 58, 59, 25, 26, 131; 3/12.8

[56] References Cited

U.S. PATENT DOCUMENTS

| 151,295 | 5/1874 | Knight | 294/26 |
|---|---|---|---|
| 2,436,507 | 2/1948 | Ellwood | 2/17 |
| 2,487,724 | 11/1949 | Pilson | 3/12.8 X |
| 2,710,571 | 6/1955 | Pfister | 172/378 |
| 2,941,214 | 6/1960 | Michael | 2/161 R |
| 3,014,750 | 12/1961 | Briggs | 294/58 |
| 3,802,302 | 4/1974 | Bengtson | 3/12.8 X |
| 3,855,633 | 12/1974 | Rhee | 2/161 A X |

*Primary Examiner*—Richard T. Stouffer
*Attorney, Agent, or Firm*—Frederick L. Bergert

[57] ABSTRACT

A device having combined features of a glove and a garden tool is disclosed. The device includes a glove element having a bar grip installed therein, with a tool element attached to the bar grip. In one embodiment, a horizontal bar grip is employed in conjunction with a tool element having forks or tines, such as a rake. In a second embodiment, a vertical bar grip is employed in conjunction with a tool element which has the form of a scoop or spade.

8 Claims, 2 Drawing Figures

GLOVE AND TOOL DEVICE

BACKGROUND AND SUMMARY OF THE INVENTION

The present invention is related to a device having the combined features of a glove and a garden tool. More particularly, the present invention is related to a garden tool which includes the general shape or form of a glove, and with grip means located on the interior of the glove, in order to provide for ease of use and control of garden tools or implements, while protecting the hand and forearm from scratches, dirt and the like.

Various garden tools are known in the art, including tools for digging, raking, weeding and the like, employing configurations which include forks, tines, scoops or spade-type configurations in order to carry out various gardening chores. While gloves may often be worn in the use of such tools, the use of ordinary garden gloves does not altogether prevent the scratching and soiling of the hands of the gardener. In addition, some of the garden gloves presently on the market are rather cumbersome and thus do not allow a firm grip to be maintained while using garden tools, with the result that the tool may slip from the hand of the gardener during use, possibly causing damage or injury to the plants being cultivated as well as to the gardener himself.

One prior art device for use as a gardener's glove is that described in U.S. Pat. No. 3,593,803, in which there is described a glove construction having flexible tool elements associated with the finger members. Another device of this type is described in U.S. Pat. No. 2,954,832, in which the glove construction is provided with tool elements which are detachable from the glove so that the glove may be used to protect the user's hand without the use of the tool elements.

By the present invention, there is provided an improved device having the combined features of a glove and garden tool, which device is constructed so as to overcome the disadvantages previously mentioned. The device of the present invention includes a glove element, having a sleeve attached on one end thereof and a tool element on the opposite end, and with a bar grip positioned on the interior of the glove. In one embodiment, the tool element is provided with forks or tines for use as a rake, for example, and the bar grip is positioned horizontally across the interior width of the glove. In another embodiment, the tool element is in the form of a scoop or spade-type element, and the bar grip is positioned vertically within the interior of the glove. The use of such a bar grip construction has been found to result in improved control of the tool element, while providing all the advantages of the use of gloves for protecting the hands and forearm.

BRIEF DESCRIPTION OF THE DRAWINGS

The advantages and features of the glove and garden tool device of the present invention will be more fully understood from the following description of the preferred embodiments, taken in conjunction with the accompanying drawings, wherein.

DESCRIPTION OF THE PREFERRED EMBODIMENTS

Figure 1:
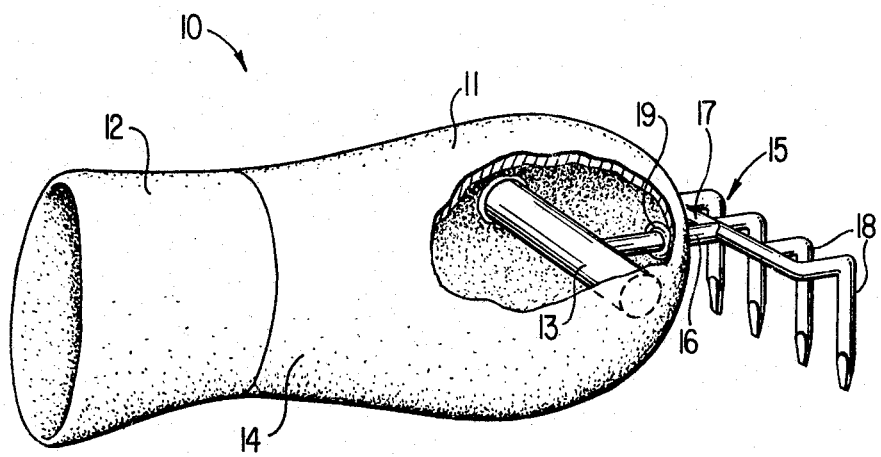
FIG. 1 is a perspective view of a first embodiment of the glove and garden tool device of the present invention, showing the tool elements formed integrally with the glove.

In the embodiment of the present invention as illustrated in FIG. 1, there is shown a glove and garden tool device 10, including a glove element 11, formed of a relatively thin, flexible tough material such as metal or plastic, and having a sleeve member 12 of canvas or other similar durable, relatively rigid material attached thereto by adhesive sealing or other conventional means.

On the interior of the glove element 11, there is positioned a horizontal bar grip 13, in the shape of a rod or bar, which is of a durable material such as metal or plastic and which may be of a size such as about 1 inch in diameter, for example. This bar grip 13 is attached at each end by adhesive sealing or other conventional means to the interior sides of the glove element 11 at a height about halfway up the sides 14 of the glove element 11. In this way, there is provided a convenient grip 13 which may be grasped by insertion of the hand through the opening at the end of the sleeve 12. The fingers and thumb are extended around the grip 13 so as to encompass the grip 13 which then rests in the palm of the hand across the width thereof.

Attached to the bar grip 13 is a tool element 15 having a handle portion 16, a head portion 17 and tines 18 extending outwardly and downwardly from the head 17, so as to form a rake configuration at the working end of the glove element 11. The tool element 15 is made of a durable material such as tool steel, for example, and may be formed integrally with the bar grip 13, or otherwise attached by conventional means. The handle portion 16 extends outwardly from the grip 13 through a small opening 19 in the outer end of glove element 11. Thus the glove element 11 is otherwise closed at its outer end to protect against scratching and soiling of the hands.

Figure 2:
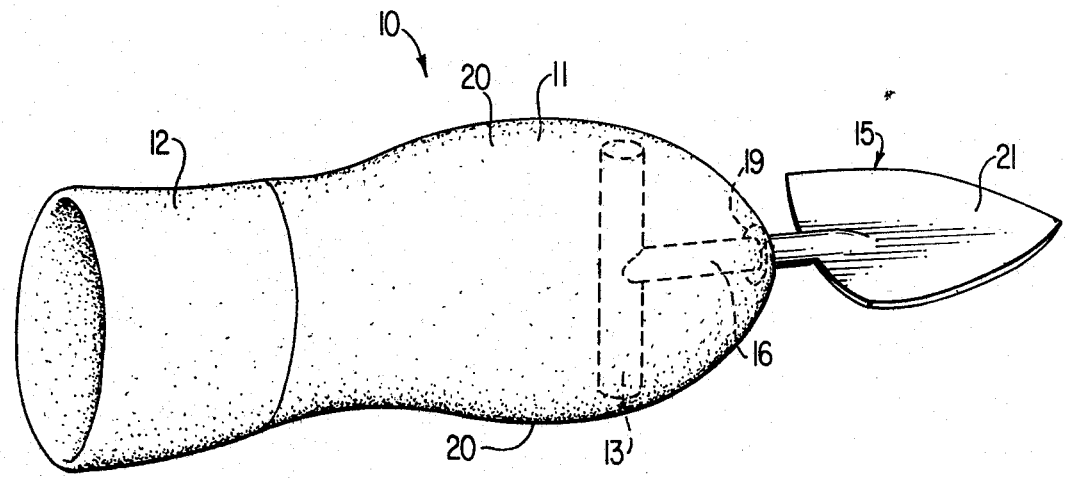
FIG. 2 is a perspective view of a second embodiment of glove and garden tool device of the present invention.

In the embodiment as shown in FIG. 2, the basic structure is similar to that of FIG. 1. However, in this embodiment, the tool element 15 is of the scoop or spade-type, having a handle portion 16 and spade portion 21. Also, the bar grip 13 is located vertically in this embodiment and attached to the upper and lower interior portions 20 of the glove element 11. In this manner, a grip is provided for the gardener as he uses the glove and garden tool device 10 for work requiring a scoop or spade.

In the use of the glove and garden tool device as shown in either FIG. 1 or FIG. 2, the gardener inserts his hand through the opening in the sleeve 12 and grasps the horizontal or vertical grip 13. It has been found that the use of a horizontal grip in the case of the fork or tine configuration tool element is advantageous in providing a firm grip for ease of control of a fork or tine-type tool such as a rake. In addition, the horizontal grip facilitates the particular hand and arm movements required in the operation of such a tool. In the case of the scoop of spade-type tool element, on the other hand, the vertical grip has been found to be advantageous in allowing a firm grip to be maintained in order to control the scoop or spade-type tool, as well as in facilitating the particular hand and arm movements required in the operation of a scoop or spade-type tool.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely the preferred embodiments thereof.

It is claimed:

1. A glove and tool device, comprising: a glove element having upper and lower portions connected by side portions and an opening at one end thereof for insertion of the hand of a user of the device, said opening being in free communication with the entire interior of the glove element; a bar grip positioned on the interior of said glove element to provide a grip which may be grasped by insertion of the hand through the opening and extending the fingers and thumb around said bar grip, said bar grip being in a generally horizontal position and fixedly attached at each of its ends to each of the opposite interior side portions of said glove element; a longitudinally extending handle member having one end thereof attached to the bar grip and a tool element attached to the opposite end of said handle member, said tool element being provided with a base portion extending laterally in both directions from said handle member, said opposite end of said handle member being attached directly to said base portion, said tool element extending outwardly from the base portion thereof to an earthworking edge, said handle member extending outwardly from the end of said glove element which is opposite to that in which the opening is located such that said tool element is on the exterior of said glove element, a major portion of the longitudinal extent of said handle member being within said glove, whereby control of said tool element is facilitated.

2. The device of claim 1, wherein said tool element is provided with forks or tines.

3. The device of claim 1, wherein a sleeve member is attached to said glove element on the end opposite the end from which the tool element extends.

4. The device of claim 1, wherein said glove element has a closed end portion at the end from which said tool element extends, with the exception of an opening through which said handle member extends.

5. A glove and tool device, comprising: a glove element having upper and lower portions connected by side portions and an opening at one end thereof for insertion of the hand of a user of the device, said opening being in free communication with the entire interior of the glove element; a bar grip positioned on the interior of said glove element to provide a grip which may be grasped by insertion of the hand through the opening and extending the fingers and thumb around said bar grip, said bar grip being in a generally vertical position and fixedly attached at each of its ends to each of the upper and lower interior portions of said glove element; a longitudinally extending handle member having one end thereof attached to the bar grip and a tool element attached to the opposite end of said handle member, said tool element being provided with a base portion extending laterally in both directions from said handle member, said opposite end of said handle member being attached directly to said base portion, said tool element extending outwardly from the base portion thereof to an earthworking edge, said handle member extending outwardly from the end of said glove element which is opposite to that in which the opening is located such that said tool element is on the exterior of said glove element, a major portion of the longitudinal extent of said handle member being within said glove, whereby control of said tool element is facilitated.

6. The device of claim 5, wherein said tool element is in the form of a scoop or spade.

7. The device of claim 5, wherein a sleeve member is attached to said glove element on the end opposite the end from which the tool element extends.

8. The device of claim 5, wherein said glove element has a closed end portion at the end from which said tool element extends, with the exception of an opening through which said handle member extends.

* * * * *